United States Patent
Coffman et al.

(10) Patent No.: US 7,739,211 B2
(45) Date of Patent: Jun. 15, 2010

(54) DYNAMIC SNA-BASED ANOMALY DETECTION USING UNSUPERVISED LEARNING

(75) Inventors: Thayne Richard Coffman, Austin, TX (US); Braxton Eastham Thomason, Austin, TX (US)

(73) Assignee: 21st Century Technologies, Inc., Austin, TX (US)

( * ) Notice: Subject to any disclaimer, the term of this patent is extended or adjusted under 35 U.S.C. 154(b) by 889 days.

(21) Appl. No.: 11/557,584

(22) Filed: Nov. 8, 2006

(65) Prior Publication Data
US 2008/0109730 A1    May 8, 2008

(51) Int. Cl.
*G06N 5/00*    (2006.01)
(52) U.S. Cl. .......................................... 706/45; 726/23
(58) Field of Classification Search ............. 706/15–20, 706/22, 45–47; 709/224; 726/22–25; 705/1
See application file for complete search history.

(56) References Cited

U.S. PATENT DOCUMENTS 7,530,105 B2 * 5/2009 Gilbert et al. ................. 726/22
7,624,448 B2 * 11/2009 Coffman ....................... 726/23
2009/0313346 A1 * 12/2009 Sood ............................ 709/207
2009/0319472 A1 * 12/2009 Jain et al. ...................... 707/2

OTHER PUBLICATIONS

Getoor, et al., Link Mining: A Survey, 2005, SIGKDD Explorations Newsletter, vol. 7, Issue 2, pp. 3-12.*
Coffman, et al. Graph-Based Technologies For Intelligence Analysis, 2004 Communications of the ACM, vol. 47, No. 3, pp. 45-47.*
Holzer et al., Email Alias Detection Using Social Network Analysis, Aug. 2005, ACM LinkKDD, pp. 52-57.*
Coffman, et al., Mining Graph Data, Dec. 2006, John Wiley & Sons, Chapter 17, pp. 443-469.*

* cited by examiner

*Primary Examiner*—David R Vincent
(74) *Attorney, Agent, or Firm*—Dillon & Yudell LLP

(57) ABSTRACT

A method, system, and computer program product for enabling dynamic detection of anomalies occurring within an input graph representing a social network. More specifically, the invention provides an automated computer simulation technique that implements the combination of Social Network Analysis (SNA) and statistical pattern classification for detecting abnormal social patterns or events through the expanded use of SNA Metrics. The simulation technique further updates the result sets generated, based on observed occurrences, to dynamically determine what constitutes abnormal behavior, within the overall context of observed patterns of behavior.

32 Claims, 10 Drawing Sheets

DYNAMIC SNA-BASED ANOMALY DETECTION USING UNSUPERVISED LEARNING

GOVERNMENT RIGHTS

This invention was made with Government support under Agreement No. W911QX-04-C-0014 with the United States Army Research Laboratories and Agreement No. F30602-03-C-0004 with the United States Air Force. The U.S. Government has certain rights to this invention.

PRIORITY CLAIM

Benefit of priority under 35 U.S.C. §119(e) is claimed based on U.S. Provisional Application No. 60/794,261, entitled, "SNA-Based Anomaly Detection," filed on Apr. 21, 2006 which disclosure is incorporated herein by reference.

RELATED APPLICATIONS

The present application is related to the following co-pending U.S. Patent Applications: U.S. patent application Ser. No. 11/367,944 filed on Mar. 4, 2006; and U.S. patent application Ser. No. 11/367,943 filed on Mar. 4, 2006. Relevant content of the related applications are incorporated herein by reference.

BACKGROUND OF THE INVENTION

1. Field of the Invention

The present invention relates generally to evaluation of social networks and in particular to computer-implemented evaluation of social networks. Still more particularly, the present invention relates to a method, system and computer program product for providing automated anomaly detection within social networks.

2. Description of the Related Art

Social Network Analysis (SNA) is a technique utilized by anthropologists, psychologists, intelligence analysts, and others to analyze social interaction(s) and/or to investigate the organization of and relationships within formal and informal networks such as corporations, filial groups, or computer networks.

SNA typically represents a social network as a graph (referred to as a social interaction graph, communication graph, activity graph, or sociogram). In its simplest form, a social network graph contains nodes representing actors (generally people or organizations) and edges representing relationships or communications between the actors. In contrast with databases and spreadsheets, which tend to facilitate reasoning over the characteristics of individual actors, graph-based representations facilitate reasoning over relationships between actors.

In conventional analysis of these graphs most analysts search and reason over the graphs visually, and the analysts are able to reason about either the individual actors or the network as a whole through graph-theoretic approaches. Social Network Analysis (SNA) was developed to describe visual concepts and truths between the observed relationships/interactions. In conventional social network analysis, most graphs are analyzed by visual search and reasoning over the graphs. Analysts are able to reason about either individual actors or the network as a whole through various approaches and theories about structure, such as the small-worlds conjecture. Thus, SNA describes visual concepts and truths between the observed relationships and actors.

Analysts use certain key terms or characterizations to refer to how actors appear to behave in a social network, such as gatekeeper, leader, and follower. Designating actors as one of these can be done by straightforward visual analysis for static (i.e., non-time varying graphs of past activity). However, some characterizations can only be made by observing a graph as the graph changes over time. This type of observation is significantly harder to do manually.

Thus, SNA metrics were developed to distill certain aspects of a graph's structure into numbers that can be computed automatically. Metrics can be computed automatically and repetitively for automated inspection. Decision algorithms, such as neural networks or hidden Markov models may then make the determination if a given actor fills a specific role. These algorithms may be taught to make the distinction with labeled training data.

With conventional SNA techniques, there is presently no convenient way to (a) determine the functional roles of individuals and organizations in a social network (e.g., gatekeepers, leaders, followers) and (b) diagnose network-wide conditions (e.g., too much centralization of authority, inefficient communication paths, etc.). These processes and others have not been addressed with conventional SNA techniques and SNA systems, which typically rely on manual observations by the analyst with no application to anomalies within the data.

Also, where traditional metric analysis fails is when there either is (a) no labeled training data or (b) not an accurate enough model to determine what is normal or abnormal. Thus, the present invention recognizes that a need exists for a more robust and automatic method for enabling analysts to computationally analyze social networks to determine anomalies within data, even when there is no pre-established norm with which to compare the data.

SUMMARY

Disclosed are a method, system, and computer program product for enabling dynamic detection of anomalies occurring within an input graph representing a social network. More specifically, the invention provides an automated computer simulation technique that implements the combination of Social Network Analysis (SNA) and statistical pattern classification for detecting abnormal social patterns or events through the expanded use of SNA Metrics. The simulation technique further updates the result sets generated, based on observed occurrences, to dynamically determine what constitutes abnormal behavior, within the overall context of observed patterns of behavior.

The method comprises several processes beginning with receiving at the computer performing the processing a data set of social network interactions and communications data of multiple participants. The computer executes an SNA utility that completes the various analyses. The utility first configures metrics and associated tolerances, where the tolerances enable dynamic learning of what is within a range of normal over a period of time. The utility then converts the data set to a graphical representation, containing a node for each participant among the multiple participants. Metrics are then computed for each node within the graphical representation. Following, the utility determines when the metrics computed for a particular data point within the data set falls outside of a pre-calculated normal range bounded by the associated tolerances. The determination automatically identifies abnormal events in a provided communication pattern, without requiring an input of a priori models for normal or abnormal behavior. Thus, complex aspects of communication patterns identified within the data set are converted into a variety of simple numerical measures and graphical structures are converted into numerical values utilizing SNA metrics. Finally, the particular data point whose metrics fall outside the normal range is tagged as an anomaly.

In one embodiment, a social network graph is received as a data input, and the social network graph is generated utilizing computer based graph representation of communication patterns within a computer network. With this implementation, the anomaly is automatically identified as a potential intruder, and the SNA anomaly identification provides enhanced intrusion detection within an graph-based intrusion detection scheme.

With the above embodiment, the utility provides a statistical pattern classification for detecting abnormal social patterns or events through the use of SNA Metrics. When the data set is received, the utility clusters data points from the received data set to generate model clusters having normal cluster values. Then, the utility determines whether a threshold baseline for a minimum number of metrics for anomaly evaluation is established. Following, when the threshold baseline has not been established, the utility (a) stores the computed metrics; (b) determines whether a pre-set minimum number of SNA metrics have been stored to meet the baseline minimum number of metrics for anomaly evaluation; and (c) converts the next data block into a graph.

BRIEF DESCRIPTION OF THE DRAWINGS

This invention is described in an illustrative embodiment in the following description with reference to the drawings, in which like numbers represent the same or similar elements, as follows.

DETAILED DESCRIPTION OF PREFERRED EMBODIMENTS

Figure 1A:
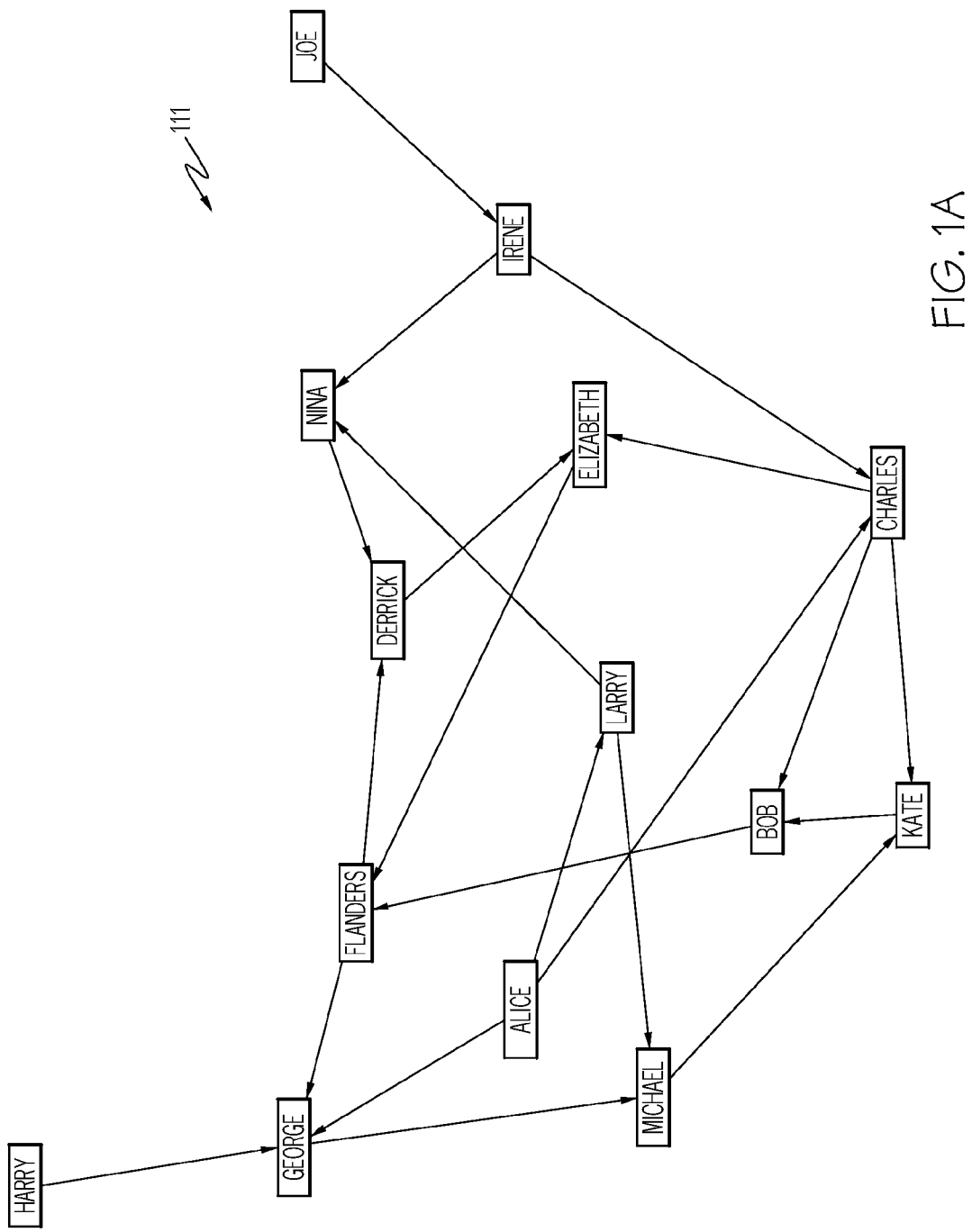
FIG. 1A illustrates an example of a human social (or communication) network on which the features of social network analysis (SNA) anomaly detection (AD) may be applied, according to one embodiment of the invention.

The present invention provides an automated computer simulation technique that implements a novel combination of Social Network Analysis (SNA) and statistical pattern classification for detecting abnormal social patterns or events through the use of SNA Metrics. Throughout the specification, this novel approach is referred to as SNA anomaly detection (or SNA_AD).

The description of the invention is presented with several sections and subsections, delineated by corresponding headings and subheadings. The headings and subheadings are intended to improve the flow and structure of the description, but not place any limitations on the invention. Further, functional features provided within specific sections may be practiced individually or in combination with other features provided within other sections.

More specifically, labeled section A provides a structural layout for a physical and a logical network and an example social network, along with hardware/software components of an example data processing system utilized to perform the SNA_AD features. Labeled section B describes software-implemented features of an SNA_AD utility and introduces the specific types of SNA and SNA metrics utilized by the SNA_AD utility. Labeled section C provides a description of the functional components of and processes provided by SNA_AD utility and corresponding algorithm. Finally, labeled section D provides several applications of SNA_AD within other processes, such as a Computer Detection process.

A. Social Network, Data Processing System's Hardware and Software Components

Generally, within the following descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

With reference now to the figures and in particular to FIG. 1A, there is illustrated an example social network within which the features of the present invention may advantageously be implemented. Social network 111 is a person-to-person network. Within the illustrated graph of this social network 111, edges represent contact or knowledge of the person. In one embodiment, the edges could be weighted to describe how well the two persons know each other, or how frequent their contact is.

Within the description of the invention, a social network is utilized to loosely refer to a collection of communicating/interacting persons, devices, entities, businesses, and the like within a definable social environment (e.g., familial, local, national, and/or global). Within this environment, a single entity/person may have social connections (directly and indirectly) to multiple other entities/persons within the social network, which is ultimately represented as a series of interconnected data points/nodes within an activity graph (also referred to herein as an input social network graph). Generation of an example activity graph is the subject of the co-pending application (Ser. No. 11/367,944), whose content has been incorporated herein by reference. Thus, the social network described within the invention may also be represented as a complex collection of interconnected data points within a graph.

Figure 1B:
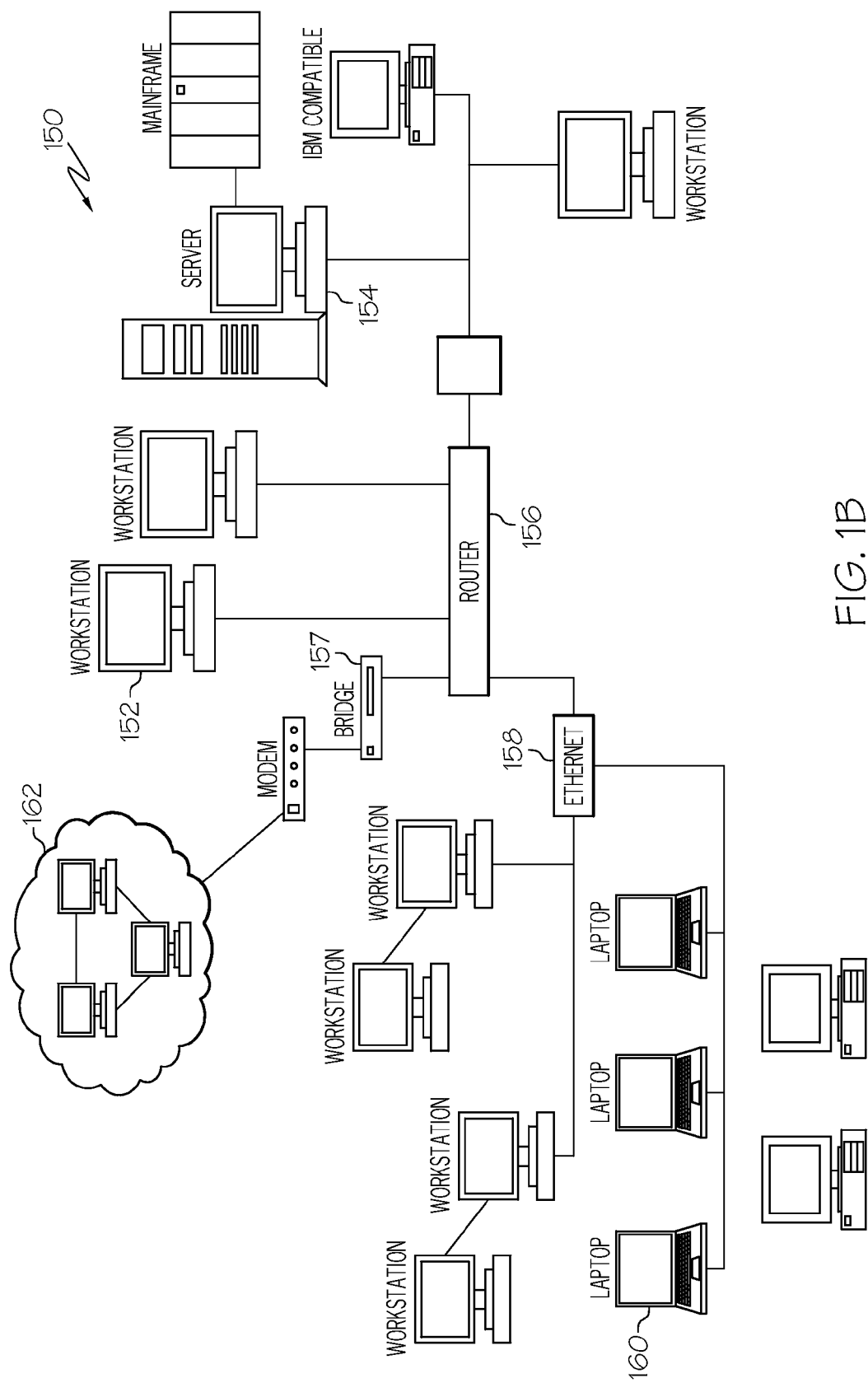
FIG. 1B illustrates an example physical network, which may generate an example logical network of communication among the devices, similar to the logical network of FIG. 1B, which logical network is then analyzed using SNA_AD according to one embodiment.

Referring first to FIG. 1B, there is illustrated an example physical network, which may be represented via a logical communication structure and ultimately a social network, according to the invention. As shown, physical network comprises a collective of inter-connected computer systems interconnected via various mediums and connection devices, of which router 156, Ethernet 158, and bridge 157 are illustrated. The various connection devices of physical network 150 provides network backbone/infrastructure, which is a network of communication links between the various devices, one or more servers 154, and a plurality of user devices. In addition to workstation 152, other user devices, such as laptop 160, are illustrated coupled to physical network 150. Several workstations 152 are illustrated interconnected in a domain 162. Physical network 150 of FIG. 1B may comprise other electronic communication devices (e.g., cell phones and personal digital assistants (PDAs)). Further, physical network 160 may also be an interactive collection of networks and sub-networks.

Figure 1C:
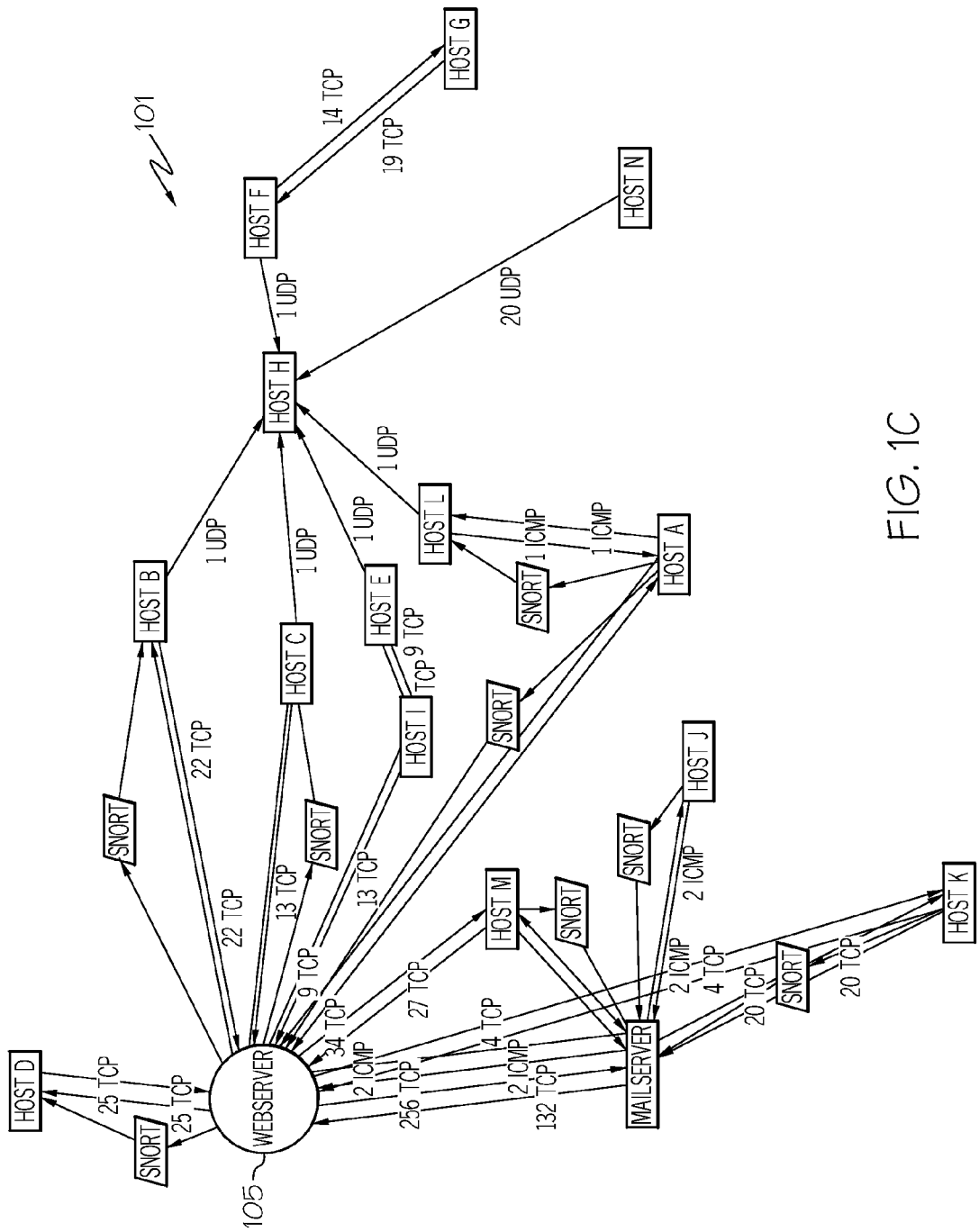
FIG. 1C illustrates an example logical network within which SNA_AD may be implemented, according to an embodiment of the invention.

Referring now to FIG. 1C, there is illustrated a time slice of the logical connection/communication of an example network (i.e., a communication network). Within the graph of logical network 101, rectangular nodes represent hosts, trapezoidal nodes represent events, and the circular node is a webserver 105 (i.e., a data processing system). Logical network 101 illustrates the logical connections between devices on the physical network (referred to as hosts) and the exchange of information and data via various protocols, such as TCP and UDP. Logical network 101 also displays the system agents (snort, etc,), which monitor activity at the logical level and reports such activity back to a central web server 105 for compilation of a network graph.

It is understood that with physical network 162 and logical network 101, each computer system or other network device connected within social network 101 typically has associated therewith an individual who directs the communication from that device to another within the social network 101. Thus, most computer-based physical network 150 or logical network 101 may ultimately be represented as a social network of persons/individuals and/or groups and/or organizations and/or entities (such as organizations, businesses, schools, government entities, and so forth). When social network 111 derives from a physical computer network 150 or logical network 101, social network 101 may be represented as an example graph generated from "eGMIDS", which is described within co-pending patent application, previously incorporated herein by reference.

Physical network 150 (or logical network 101) may include additional devices, etc. which are not shown. The exact complexity of network devices may range from a simple two device network to a network comprising thousands or more interconnected devices. In more complex implementations, physical network 150 may comprise a wide area network (WAN), such as the Internet and the network infrastructure may be represented as a global collection of smaller networks and gateways that are interconnected to and communicate with each other.

FIGS. 1A, 1B, and 1C, described above, and the other figures described below are provided as examples within the illustrative embodiment(s), and are not to be construed as providing any architectural, structural or functional limitation on the present invention. The figures and descriptions accompanying them are to be given their broadest reading including any possible equivalents thereof.

In one embodiment, a dedicated anomaly detection device, referred to hereinafter as SNA_AD device, is provided and comprises several hardware and software components that enable dynamic SNA_AD functionality, based on (1) received data/information from the physical network 150, (2) pre-defined and/or newly defined SNA metrics, and/or (3) other user-provided inputs. As further illustrated within FIG. 2 and described below, SNA_AD device may be a data processing system executing an SNA_AD utility that completes the specific SNA-AD functional features described below. In one embodiment, as described in details in section D below, SNA_AD device receives an input graph generated via an enhanced GMIDS (eGMIDs) process, which is described within co-pending application (Atty. Doc. No. 21Century.000002). The input graph provides the social network dataset and/or a graph representation of the SNA_AD dataset from the network, such as shown by logical network 101. In another embodiment, the user provides the input social network graph via some input means of the SNA-AD device. Actual network-connectivity of the SNA_AD device is not a requirement for the implementation of the invention, and the remainder of the invention is described with reference to a standalone data processing system, as illustrated by FIG. 2.

Figure 2:
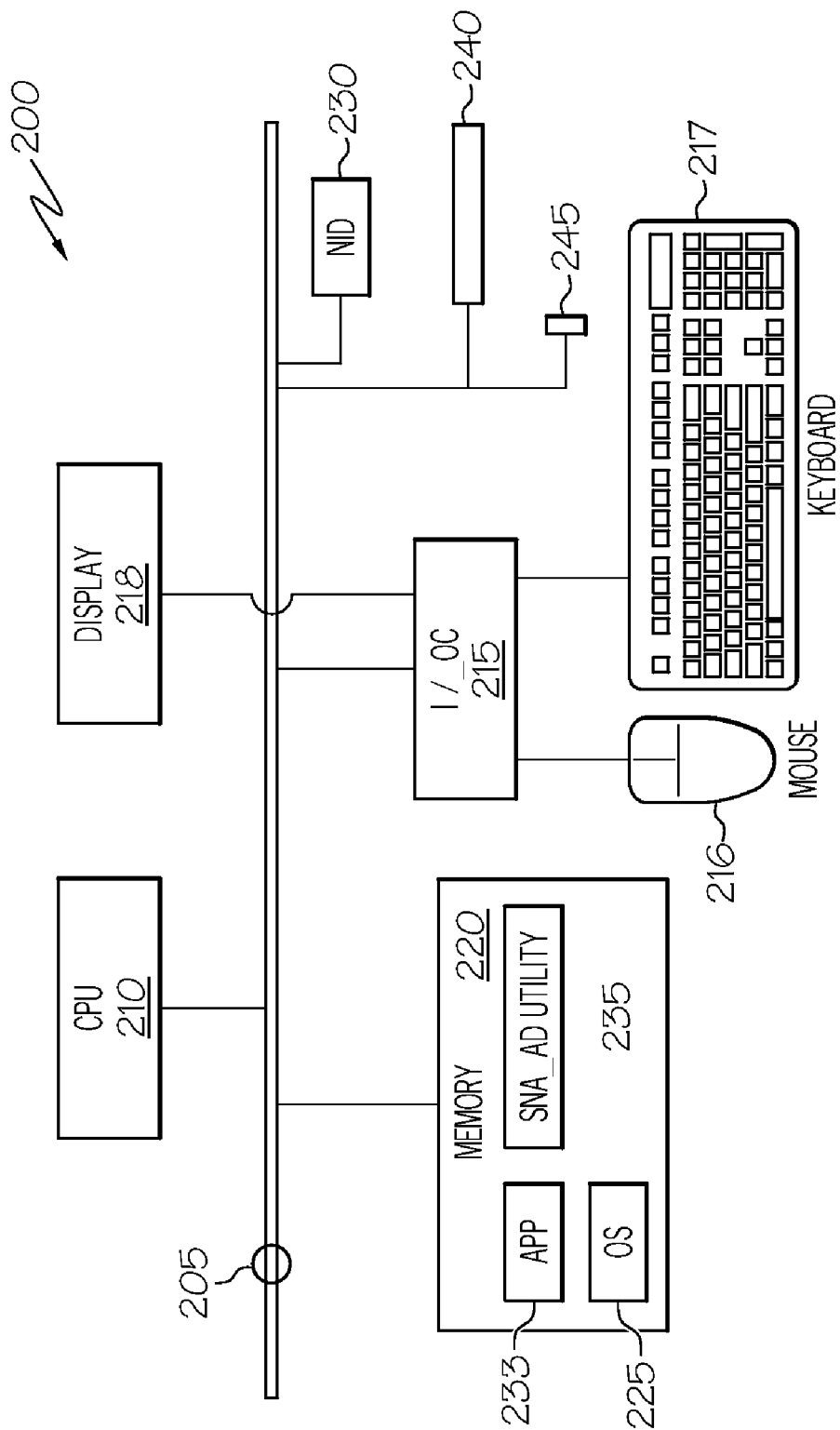
FIG. 2 is a block diagram representation of an example data processing system, which may be utilized to provided the various SNA_AD functions via execution of an SNA_AD utility, according to one embodiment of the invention.

Referring now to FIG. 2, there is depicted a block diagram representation of a data processing system that may be utilized as the SNA_AD device (e.g., web server 105), in accordance with an illustrative embodiment of the present invention. As shown, data processing system (DPS) 200 comprises one or more central processing units (CPU) 210 connected to memory 220 via system interconnect/bus 205. Also connected to system bus 205 is I/O controller 215, which provides connectivity and control for input devices, mouse 216 and keyboard 217, and output device, display 218. Additionally, a multimedia drive 240 (e.g., CDRW or DVD drive) and USB (universal serial port) hub 245 are illustrated, coupled to I/O controller. Drive 240 and USB port 245 may operate as both input and output mechanisms.

DPS 200 is also illustrated with a network interface device (NID) 230 with which DPS 200 connects to another computer device or computer network (FIG. 1A). NID 230 may comprise modem and/or network adapter, for example, depending on the type of network and connection to the network. It is however understood that application of the various processes of the invention may occur within a DPS 200 that is not connected to an external network, but receives the input data (e.g., input social network graph) via some other input means, such as a CD/DVD medium within multimedia input drive 240, a thumb drive inserted in USB port 245, user input via keyboard 217 or other input device, etc.

Those of ordinary skill in the art will appreciate that the hardware depicted in FIG. 2 is a basic illustration of a data processing system and may vary. Thus, the depicted example is not meant to imply architectural limitations with respect to the present invention.

B. SNA_AD Software Utilities and SNA Metrics

Notably, in addition to the above described hardware components of DPS 200, various features of the invention are provided as software code stored within memory 220 or other storage (not shown) and executed by CPU 210. Thus, located within memory 220 and executed on CPU 210 are a number of software components, including operating system (OS) 225 (e.g., Microsoft Windows®, a trademark of Microsoft Corp, or GNU®/Linux®, registered trademarks of the Free Software Foundation and The Linux Mark Institute) and software applications, of which SNA_AD utility 235 is shown. In actual implementation, SNA_AD utility 235 may be loaded on to and executed by any existing computer system to provide the dynamic anomaly detection features within any input social network graph provided, as further described below.

CPU 210 executes SNA_AD utility 235 as well as OS 225, which supports the execution of SNA_AD utility 235. In the illustrative embodiment, several graphical and other user interface features are enabled by SNA_AD utility 235 and supported by the OS 225 to enable user interaction with, or manipulation of, the parameters utilized during processing by SNA_AD utility 235. Among the software code/algorithm provided by SNA_AD utility 235, which are specific to the invention, are (a) code for enabling the various anomaly detection processes, and (b) code for generating and displaying an SNA_AD console and enabling user setup, interaction and/or manipulation of the processing; and (c) code for generating and displaying the output of the anomaly detection processes in user-understandable format. For simplicity, the collective body of code that enables these various features is referred to herein as SNA_AD utility 235. According to the illustrative embodiment, when CPU 210 executes OS 225 and SNA_AD utility 235, DPS 200 initiates a series of functional processes, corresponding to the SNA_AD features/functionality described below and illustrated by FIGS. 3-6.

Social Network Analysis (SNA) & SNA Metrics

The primary goal of the various applications of SNA anomaly detection is to quickly differentiate between normal and abnormal (social and perhaps other) communication patterns. Within the invention, this goal is accomplished by utilizing SNA metrics to (a) analyze structure, behavior, and communication patterns and (b) isolate indicators of unusual or abnormal activity. According to the described invention, one goal of SNA_AD is to flag abnormal events in a group's or individual's communication patterns, without requiring users to specify a priori models for normal or abnormal behavior.

In the described embodiment, SNA metrics are utilized as a fundamental tool within the processes of anomaly detection. As provided within the executing SNA_AD utility, SNA metrics are utilized to enable complex aspects of communication patterns to be distilled into a variety of simple numerical measures. The set of SNA metrics provided within the SNA_AD utility may continually evolve, such that they quantify different facets of social interaction patterns, as those patterns themselves evolve. Implementation of the invention may utilize a large number of metrics, several of which are specifically designed and/or created to enable more precise/accurate SNA_AD functionality. These metrics are provided based on recognition that the behaviors and interaction patterns of actors are capable of being quantified and reasoned over in a rigorous mathematical framework.

Accordingly, the invention utilizes both existing and novel SNA metrics, and the use of this technology is not limited to any particular metric or set of metrics. In an illustrative embodiment, one instantiation of the invention supports the following SNA metrics: (1) Average cycle length; (2) Average path length; (3) Betweenness centrality; (4) Characteristic path length; (5) Circumference; (5) Cliquishness; (6) Closeness centrality; (7) Closeness centrality (sum of inverse distances); (8) Clustering coefficient; (9) Density; (10) Diameter; (11) External to internal ratio; (12) Girth; (13) Global efficiency; (14) Homogeneity (15) Incoming degree; (16) Local efficiency; (17) Number of nodes; (187) Outgoing degree; (19) Radiality; (20) Radius; and (21) Undirected degree. Other metrics are continually developed for utilization within the SNA_AD utility.

In one embodiment, when computed on a sociogram, SNA metrics convert abstract concepts, such as "Person X is central to this organization" or "This organization has a very redundant communication structure" into specific numbers. As an example, the techniques/algorithm of the invention enable computation of the betweenness centrality of a specific node in a sociogram to generate a value that measures how often communications in the organization flows through a given person. In an alternate embodiment, the algorithm of the invention computes the density or global efficiency metrics to measure how much redundancy exists in the communication structure. Thus, during analysis of an input social network graph (or data set), each SNA metric transforms a different aspect of the communication structure into a number.

SNA Statistical Pattern Classification

According to the invention, by utilizing classical statistical pattern classification techniques, observed objects or events are able to be categorized into various categories. There are two general categories of statistical pattern classification techniques: supervised and unsupervised learning. Both methods treat each input object as a set of observable values called features. Objects are categorized based on the measured values of their various features (or combinations of their features).

Supervised learning approaches require user-specified a priori models of both normal and abnormal behavior, and thus, supervised learning requires labeled training data. Supervised learning requires a priori models of the features exhibited by the different categories. For example, to classify pictures of fruit into apples or oranges, prior knowledge is required on what a picture of an apple or orange would look like. This prior knowledge is specified by the labeled training data. In the present example, the user would explicitly specify a model of expected feature values by labeling example pictures as apples or oranges. These expected values are then provided as part of the input to the system. Supervised learning techniques perform the task of "tell me if this new object looks like an apple or an orange." However, with this implementation it is understood that these labeled training data are typically unavailable and that even if the labeled training data is available, these models may not be robust enough to adequately represent what is "normal" or "abnormal." Thus, when sufficient amounts of labeled training data are absent, the methods of the invention are implemented with unsupervised learning techniques to perform the task of anomaly detection.

In unsupervised learning, observed feature values are referenced against each other rather than against an a priori model. There is no established "average behavior" and each event is classified relative to other unknowns. Training data is unlabeled, and often not even the number of potential class labels is known. There is also no a priori information about how to group or classify the data. The system is provided with a large sample of what is considered normal, and the system then has to learn what makes the sample normal. Unsupervised learning performs the task of "tell me how this object's appearance or behavior is different from either other groups or from its own past behavior."

Thus, supervised learning algorithms are utilized when there is labeled training data available, while unsupervised learning algorithms are utilized when there are unlabeled training data. While both types of statistical pattern classification are utilized within Social Network Analysis, SNA anomaly detection, provided by the invention, is primarily described herein with unsupervised learning techniques, although the features are equally applicable to supervised learning techniques. In one embodiment, a semi-supervised learning method, also called "learning with a critic," is enabled/provided. Further, in one embodiment of the invention, as detections of anomalies are alerted via the unsupervised anomaly detection algorithms, the analyst is able to view the output and make a case-by-case decision on whether the detection is a true or a false positive. This feedback is then incorporated in the anomaly detection algorithms to tune or train the algorithms to improve their results. Ultimately, this set of case-by-case decisions and corresponding evidence will constitute a labeled training dataset, which can be utilized by the static and dynamic analysis methods.

These metric values and behavior models are then used in mathematically rigorous pattern classification algorithms to classify the observed activity as normal or abnormal. Once signatures are learned by the approach, the SNA_AD utility is able to monitor newly-observed activity and alert the analyst to abnormal patterns, drastically reducing the analyst's time spent on differentiating between normal and abnormal communications patterns.

Static and Dynamic SNA

The invention provides two main methods of SNA_AD, static SNA_AD and dynamic SNA_AD. In one embodiment, SNA anomaly detection utilizes both static and dynamic SNA to analyze the behavior of groups and individuals. Static SNA reasons over a single "snapshot" of activity, with no representation of the changes in a system over time. Static SNA is useful when querying for a person or group that is behaving differently than a set of peers. Traditional statistical pattern classification typically models static SNA.

In contrast, alternate embodiments utilize dynamic SNA, which reasons over a series of snapshots of activity, in order to model behaviors or behavioral changes over time. The series of snapshots is utilized to approximate a continual time-varying signal or "stream" of monitored activity. Dynamic SNA is useful to detect instances of an individual or group acting differently than they did in the past. In such a scenario, snapshots of Person X, for example, are taken at regular time intervals, and this set of snapshots is examined for individual snapshots that are dramatically out of line with the others (given a user-defined and dynamically adjusting anomaly threshold range). Accordingly, dynamic SNA operates more with digital signal processing and time series analysis, and in one embodiment, dynamic SNA utilizes features of Hidden Markov Models (HMMs) to perform time series analysis.

Figure 6A:
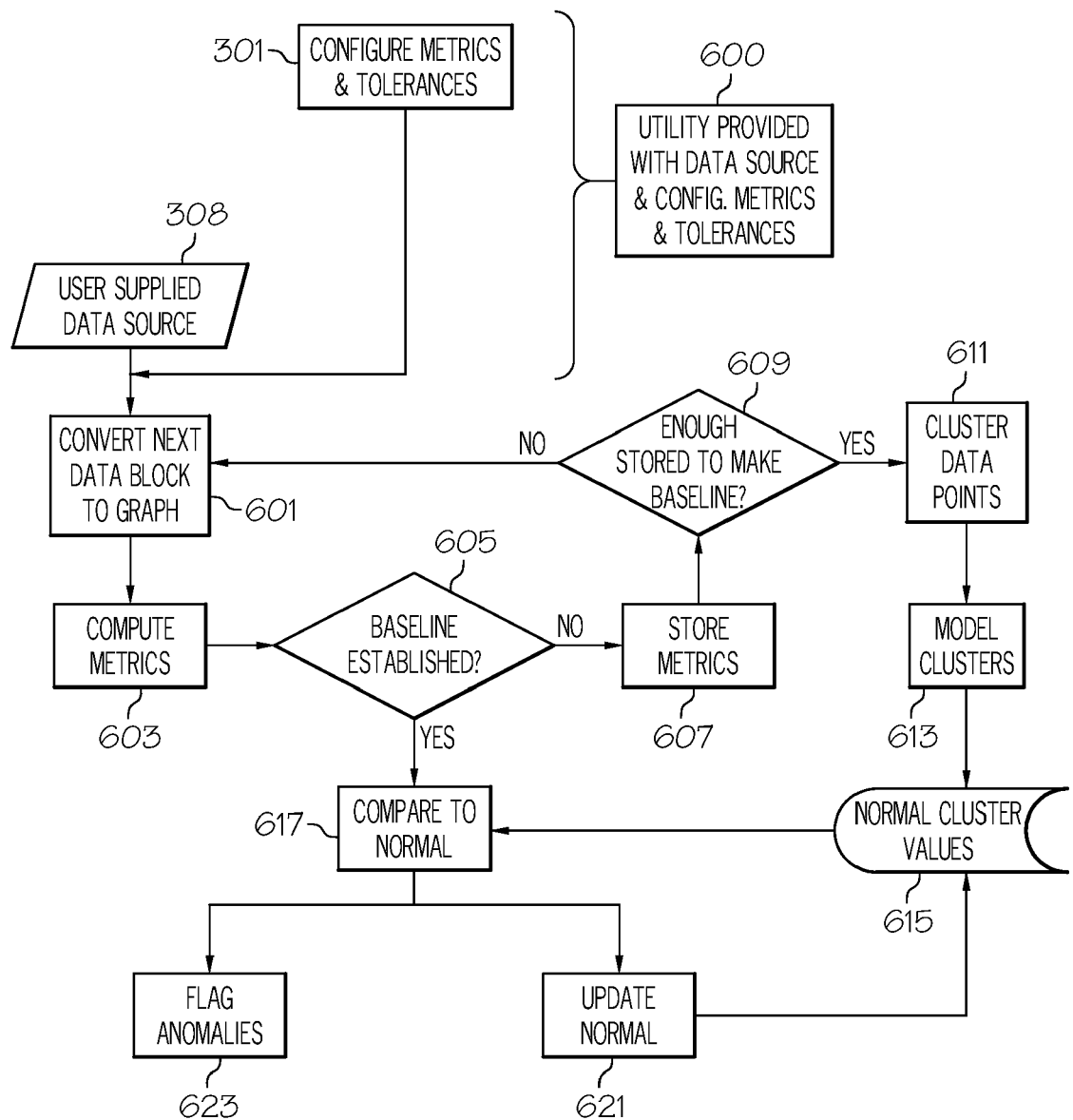
FIGS. 6A-6B is a flow chart of the process of completing SNA_AD on an input social network graph in accordance with one embodiment of the invention.
Figure 6B:
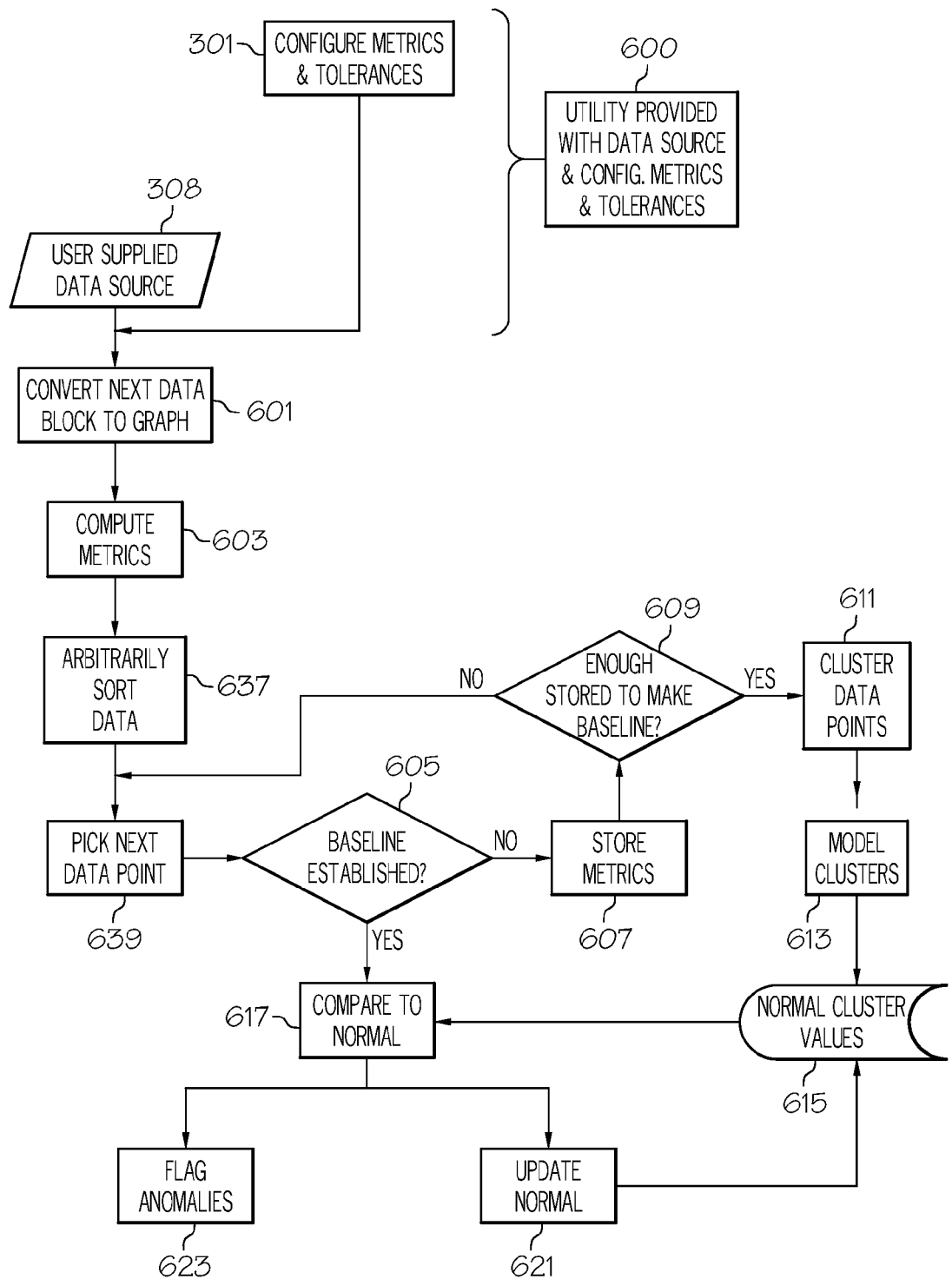

In some instances, static SNA is sufficient to characterize a group's structure or an individual's behavior as normal or abnormal. In other instances, however, dynamic SNA is required to differentiate between normal and abnormal structure and behavior, based on evolution or change in structure and behavior over time. With the described embodiments of the invention, the SNA-AD utility processes treat all data as "dynamic." Thus, the code arbitrarily orders static data points and then treats the ordered points as a dynamic set of data received in that order. FIGS. 6A and 6B, described below, illustrate the differences in initial handling of static data versus dynamic data.

C. SNA_AD Functions and Processes

Figure 3:
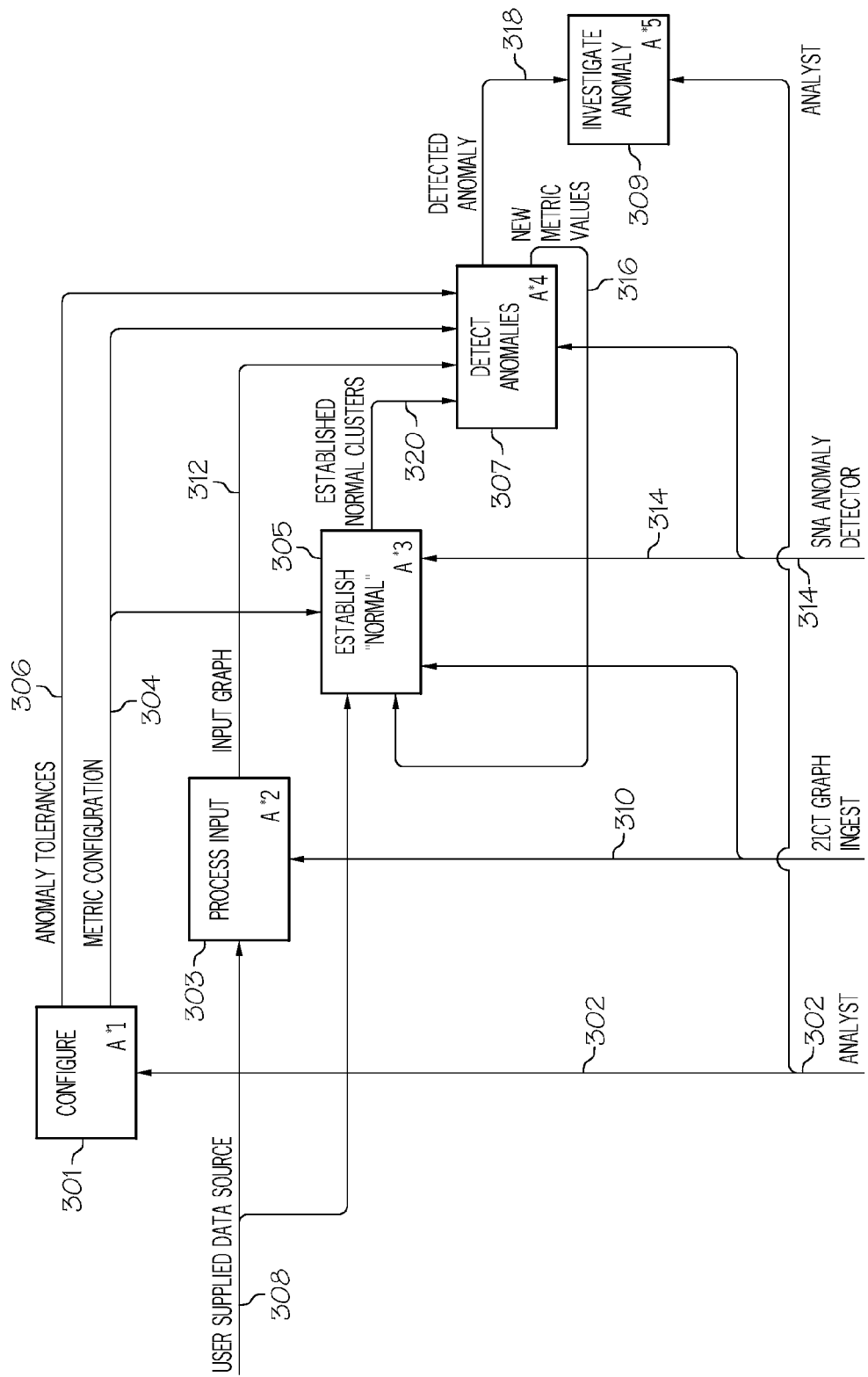
FIG. 3 is a high level functional decomposition of interactions among the functional blocks of logic that enable the various features of SNA_AD on an input social network graph, in accordance with one embodiment of the invention.
Figure 4:
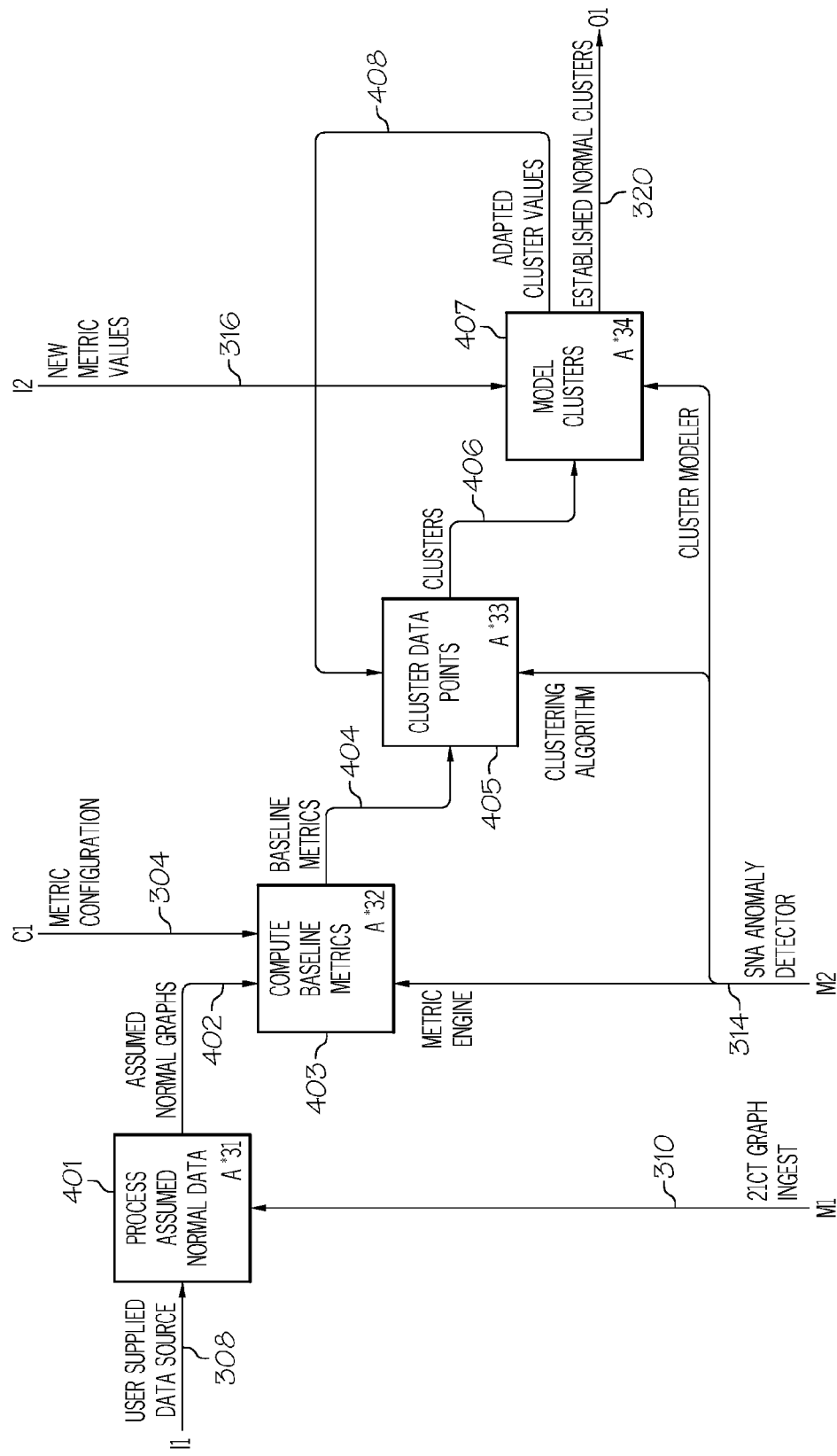
FIGS. 4 and 5 are lower level functional decompositions (or task layouts) depicting expanded views of specific functional blocks of logic depicted by FIG. 3, namely "establish normal" function block and "detect anomalies" function block, in accordance with embodiments of the invention.
Figure 5:
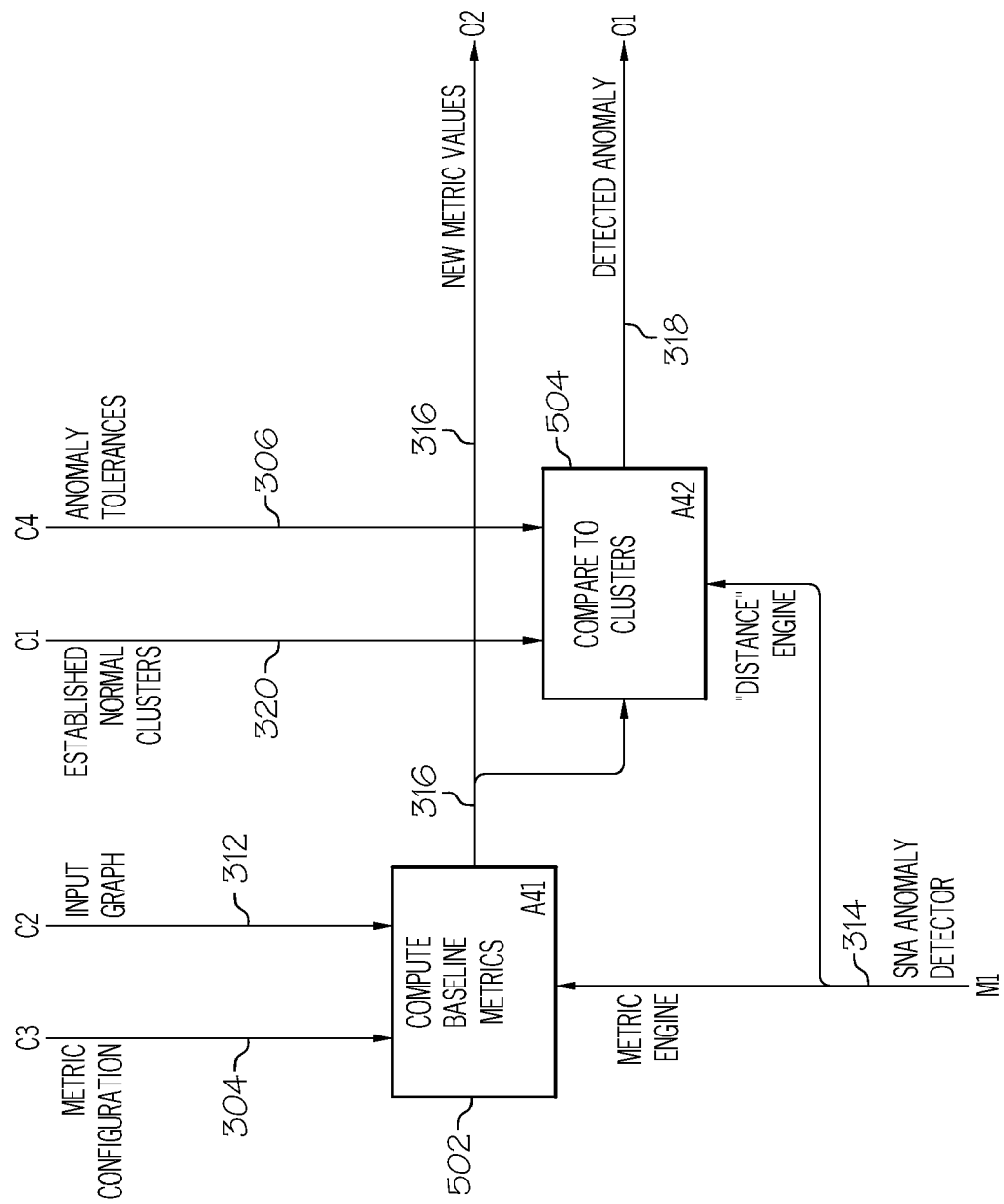

With reference now to FIGS. 3-5, there are illustrated block diagram representations (in Integrated Definitions (IDEF) format) of functional features of SNA-AD utility, the connection between the various functions, and the various user and data inputs utilized by these functions to perform the AD features of the invention. Within these diagrams, boxes represent functions or tasks (which are functional decompositions). Lines coming in from the bottom represent "mechanisms", or the actor. Lines entering a function box from the left represent inputs to the function. Controls enter the function box from the top. Within the description herein, inputs are generally modified by the function and are distinguishable from controls, which are static data, such as configuration options. Lines leaving the right side of function boxes represent outputs.

FIG. 3 provides a top-level functional decomposition of the overall SNA-AD system. FIGS. 4 and 5 then provide two sub-decompositions, which represent the further functional decomposition of two of the top-level functions. FIG. 3 illustrates the following five main functions/logic (additional functions/logic may be provided within alternate embodiments): configure function 301, process input function 303, establish normal function 305, detect anomalies function 307, and analyze anomaly function 309. Analyze anomaly function 309 is performed under the direction of a human analyst. Utilizing the anomaly tolerances, the system is able to learn what is normal over a period of time (referred to as the baseline). The input to the entire system and particularly process input function 303 and establish normal function 305 is user supplied data source 308. It is understood that user supplied data source 308 may in some implementations be replaced by a dynamically supplied input data from an eGMIDS engine, for example.

Configure function 301 is controlled by the user/analyst 302, who provides parameter settings for SNA_AD utility via user interface mechanisms (not shown). Configure function 301 outputs metric configuration 304, which comprises information about which metrics to compute, on which nodes, and how large of a subgraph to consider. Configure function 301 also outputs the anomaly tolerances 306, which are anomaly detection tolerance levels, such as how far from normal a datapoint has to be to be considered anomalous. Anomaly tolerances 306 may also include how long the utility should observe before deciding what "normal" is. Further, anomaly tolerances may include configuration data such as initial training size, also referred to herein as the baseline.

Process Input function 303 is performed by a special tool designed to process data, and referred to herein as "21CT Graph Ingest" (or Graph Ingest 310). Process Input function 303 may be any one of a number of different software modules, depending on the type of the data source (input data). Process Input function 303 receives the data source 308 and outputs an input graph 312.

Establish Normal function 305 is a repetitive function, which is performed, in a repeated fashion, by two actors/mechanisms, graph ingester 310 and the SNA anomaly detector 314. With dynamic AD, in particular, the processing by establish normal function 305 is cyclic, and that processing is further described in detail within the functional block diagram of FIG. 4 and the flowchart of FIG. 6. With each cycle, a new graph is processed for each time slice, metrics are computed, and added to the knowledge base. When enough time has elapsed (given by the configuration), the anomaly detector 314 decides what normal is and causes establish normal function 305 to output the determination of "normal" (established normal clusters 320) to the detect anomaly function 307. Additionally, establish normal function 305 also takes new metric values from the detect anomalies function 316 and process these new metric values as input to adjust the cluster centers over time. While the illustrative embodiment of the invention is described with specific reference to clustering as the method by which unsupervised learning is completed, unsupervised learning may also be completed by other methods, such as Kohonen self-organizing feature maps (a special type of neural network). The invention may be implemented utilizing any one of these methods, in alternate embodiments.

Detect Anomalies function 307 is also performed by the anomaly detector 314, and receives four control inputs, established normal clusters 320, input graph 312, metric configuration 304, and anomaly tolerances 306. Detect Anomalies function 307 takes established normal values and compares new metric values to determine if they are normal or not. Detect Anomalies function 307 also provides an output of new metric values 316 and (if found) detected anomalies 318, which detected anomalies are passed to analyze anomaly function 309, where the detected anomalies are analyzed by the user/analyst 302.

With reference now to FIG. 4, there is illustrated an internal makeup of Establish Normal function 305 of FIG. 3. As shown, Establish Normal function 305 comprises several internal functions that together complete the overall function of "establish normal" within the overall SNA_AD system. Again, user supplied (or otherwise supplied) data source 308 represents the input, which is processed into an Assumed Normal graph 402 by Process Assumed Normal Data function 401 for metric computation. Among the other functions are compute baseline metrics function 403, cluster data points function 405, and model clusters function 407. Each of the latter three functions are influenced by SNA anomaly detector 314.

Compute baseline metrics function 403 receives the assumed normal graphs 402 and metric configuration 304 as controls and generates an output of baseline metrics 404. Baseline metrics 404 are inputted to cluster data points function 405, which receives adapted cluster values 408 in a feedback configuration from model clusters function 407, and which in turn generates clusters 406. Cluster data points function 405 receives metric data points and clusters the metric data points into groups. The clusters 406 are modeled based on probability density functions, which may be specified by the user/analyst (not shown). Model clusters function 407 then operates on the received clusters 406 and together with new metric values 316 generates established normal clusters 320.

FIG. 5 provides an illustration of the internal functional makeup of "Detect Anomalies" function 307 of FIG. 3. Key functional components include compute metrics function 502 and compare to clusters function 504. Within this simple process, compute metrics function 502 generates new metric values 316, and the new metric values 316 are inputted to compare to clusters function 504, which compares the new metric values 316 to established normal clusters 320. The compare to clusters function 504 determines how far away from normal each new metric value is, and if a point in the input is outside of the established anomaly tolerances 306 when compared to the normal clusters, the compare to clusters function 504 issues an output of detected anomaly 318. Thus, the particular point is flagged as an anomaly (only when the input point falls outside of the specific anomaly tolerances 306).

There are a number of approaches for deciding if a data point should be classified as an anomaly, given incoming observations and a learned behavior model. The processes of the present invention is not bound to any particular classification approach or any particular approach to learning behavior models, but instead comprises all uses of statistical pattern classification in combination with social network analysis, for the purpose of dynamically detecting anomalous social behaviors.

In one embodiment, if an online clustering algorithm, such as Leader-Follower is utilized, any attempt by the algorithm to introduce a new cluster (after an initial training period) is, by definition, the algorithm deciding that the existing model does not fit the newly observed data, and it is thus an anomaly. In another embodiment of the invention, the SNA_AD utility considers the data's distance from existing cluster centers. In yet another embodiment, the utility fits Gaussian (or other) probability densities to the clusters and declares that any points falling outside a preset X% of the volume of the combined probability density surface are anomalous. This particular approach has the advantage that the user of the utility is able to explicitly set an expected false alarm rate. Finally, Kohonen self-organizing feature maps (a specialized type of neural network) can also be used to form models of normal behavior from unlabeled training samples, and to classify new data as normal or anomolous.

As information is gathered over time, the approach implemented by the invention automatically builds its own models of normal behavior for the groups being observed, without requiring user input or a priori behavior models. This process may be currently completed using one or more online clustering algorithms, such as the Leader-Follower algorithm and variations of K-Means Clustering, which are two examples of unsupervised machine learning algorithms. In alternate embodiments, other instantiations of the static SNA_AD include the use of neural networks or other machine learning techniques to build these behavior models. The current behavior models group observed metric values into clusters, each of which describes a normal "mode" of operation for the group.

FIGS. 6A and 6B are flow charts of the processes (over time) completed by the functions illustrated by FIGS. 3-5, for both dynamic AD (FIG. 6A) and static AD (FIG. 6B). Specifically, FIG. 6A illustrates the processes for an implementation of dynamic SNA_AD. As described below, dynamic data is applied directly to the processing modules to determine if a baseline is established. In the static SNA_AD method, static data first undergoes a sequence of pre-processing steps to convert static data into a form which emulates dynamic data. Once the static data has been converted, the static data is then applied to the processing modules. SNA_AD utility begins by tracking the SNA metric values of various groups over time, just as it is done for dynamic SNA.

In completing the process, two sets of inputs and/or controls are provided to the process, namely user supplied data source 308 and configure metrics and tolerances (301). Within the description, general references are made to the SNA_AD utility completing the various functions associated with specific functions blocks described above. For both static AD (FIG. 6B) and dynamic AD (FIG. 6A), the process begins at block 600, which illustrates the user providing the SNA_AD utility with the data source 308 (input social network graph) and the configure metrics and tolerances 301. The latter control inputs may be dynamically generated given other user inputs or previous runs of the utility. With the input data provided, the utility converts the next data block to graph, as shown at block 601. Following, at block 603, the utility computes the metrics to be utilized within the process.

For static AD, pre-processing of the input data is then completed as provided by the additional blocks (637, 639) of FIG. 6B. Accordingly, after the utility converts the next data block to graph (601) and computes the metrics to be utilized within the process (603), the utility then arbitrarily sorts the data, as shown at block 637. Then, the utility picks a next data point from the sorted data, as provided at block 639. According to the invention, SNA metrics are measured on many people or groups. From these metrics, individuals or groups whose metrics are atypical in comparison with others are considered anomalous. This approach does not require the tracking of metrics over time. Rather, a snapshot of the data at a particular point in time is all that is needed for analysis.

The remaining steps in the process of FIGS. 6A and 6B apply to all data, whether originally dynamic data or converted from static data according to the above processing. Both FIGS. 6A and 6B thus illustrates similar processing with the data received at process block 605, and the description which follows equally applies to both figures. With the metrics computed, a determination is made at block 605 whether the baseline has been established, and if not, then the computed metrics are stored at block 607. Following, a next determination is made at block 609 whether there are enough stored metrics to make Baseline. If not, then the process returns to block 601 at which the next data block is converted to graph. However, if there are enough stored metrics, the data points are clustered, as indicated at block 611. Following the clustering of the data points, the clusters are modeled, as shown at block 613, then the normal cluster values are generated at block 615. These normal cluster values are then provided to be utilized in the comparison with the defined normal.

Returning to decision block 605, when the baseline is established, the utility then initiates a comparison to normal function at block 617 during which the values are compared to the normal cluster values. A check on whether the value is normal is completed and then based on the result of the check, the set of normal values is updated to include the present value (if the value is normal), as indicated at block 621, and the value is flagged as an anomaly, if the value is determined to not be normal, as shown at block 623. Thus, both blocks 621 and 623 are updated for every iteration of the process. Utilizing the iterative updates to these final two blocks, the system is able to adapt to what is normal over time.

Figure 7A:
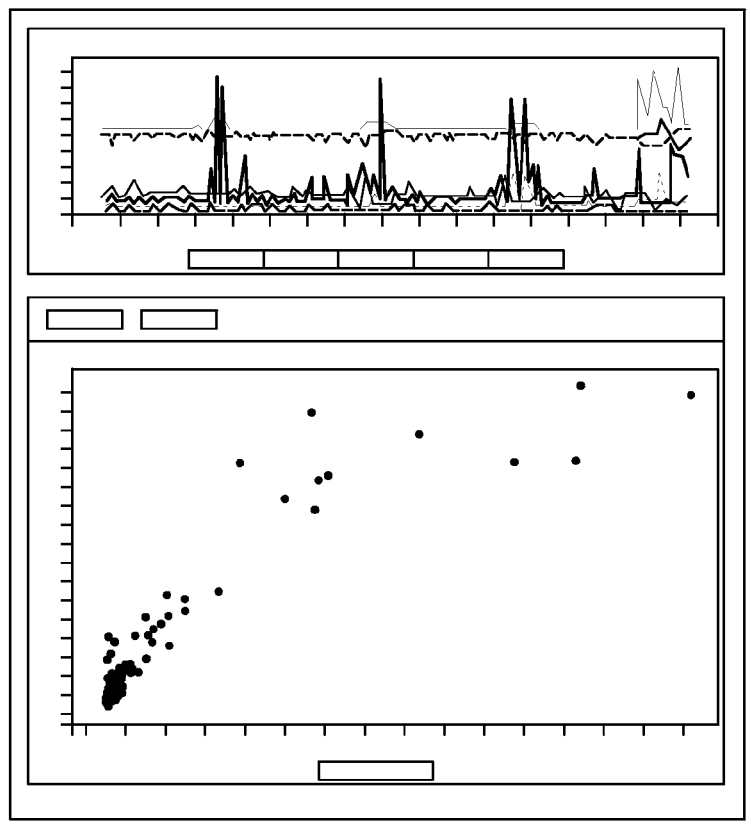
FIGS. 7A-7B illustrate graphical user interfaces depicting SNA metric values derived from an input network graph and utilized for determining which points/nodes are anomalies, in accordance with one of embodiment of the invention.
Figure 7B:
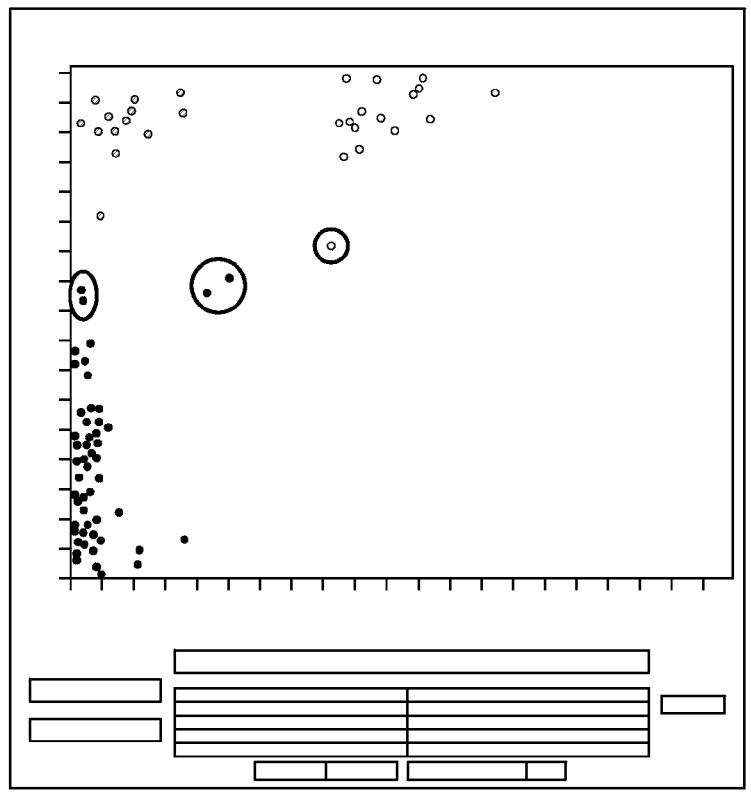

FIGS. 7A-7B illustrate a time-series view and a scatter-plot view of SNA metric values gathered over time for one actor. More specifically, the left half of FIG. 7A depicts two visualizations of multivariate SNA metric values gathered over time for one actor. The right half of FIG. 7A shows SNA metric values grouped into clusters. FIG. 7B also shows five points (circled) that, while assigned to clusters, do not fit those assignments well. These are anomalies that are being looked for, and are often previously un-manifested communication patterns that may indicate internal threats or other situations of interest. After "normal" behaviors or events are established through snapshots taken at regular intervals, it becomes possible to for the utility to identify anomalous events within this context of past behavior. Thus, anomalies are represented by any abnormal data point as defined by the normal behavior for a group or individual given these known metrics.

D. Applications of SNA_AD

In one example application of the invention, SNA metric values exhibited by threat groups (i.e., groups trying to coordinate illegal activities) are known to be very different than those exhibited by normal human social groups. Threat groups have fundamentally different priorities than normal social groups. For example, normal social groups inherently prioritize spontaneity and efficiency, so these groups adopt communication patterns that are irregular and unplanned, and that promote efficient information sharing. In contrast, threat groups typically prioritize secrecy and the ability to withstand the capture or elimination of individual group members. As a result, these threat groups adopt strict communication patterns that are drastically different than those of normal groups, and those differences are reflected in abnormal SNA metric values. SNA metrics transform the concepts of a communication structures' efficiency, spontaneity, secrecy, and robustness into numeric values. In completing this transformation, the SNA metrics (enabled within the automated SNA_AD utility) provide the intelligence analyst a way to describe threatening activity that does not require the definition of specific graph templates.

Application of SNA_AD to Computer Network Intrusion Detection

The novel features of SNA_AD may be applied to provide enhanced intrusion detection features within a computer network. One implementation provides a wide range of possible uses for SNA metrics in threat signatures, including, for example, individual, coordinated, insider, and insider-outsider threats. By analyzing SNA metrics combined with knowledge of a broader context, the intrusion detection methods are enhanced to provide a substantially more powerful result set. In one embodiment, the associated context is built from the social, task, or command and control structures of the actors involved, while in another embodiment, the context is built from the time history of the SNA metrics for the past month. In either embodiment, SNA metrics are utilized to perform communication flow analysis, where the algorithm measures the amount of information flowing between actors in counts of communications, emails, or network packets. Thus, for example, one embodiment involves measuring the SNA metrics of email communication networks.

With this application, communications flows are analyzed with respect to related network structures to identify flows that are not well explained by the related networks. For example, high communication flow may be expected between a manager and his employee, two people working on a joint project, or people that are friends outside of work. High communication flows between people (or the computers of those people) who have no explainable reason for communicating may signify something unusual (e.g., perhaps one of the machines has been compromised, or one employee is attempting to attack the machine of another).

In one embodiment, time histories of flows are utilized to build statistical representations of "business as usual", which are then utilized to identify communications flows that signify a change from the norm. Interesting changes may take the form of a sharply increased level of communication with a particular host, or a sudden increase in the breadth (number of hosts) contacted from a given machine. The process of implementing anomaly detection enables a determination of whether such deviations from historical norms have perfectly reasonable explanations (e.g., an increase in responsibilities, a new project, or a special task request) or whether the deviations are the result of an infected or compromised machine or a malicious insider activity.

While utilizing these techniques in isolation may result in false positive problems, the fusion of the SNA_AD type of analysis with other techniques described within the co-pending applications offer an enhancement to computer intrusion detection. The analysis of SNA metrics enables combination of packet-level or session-level threat rules with statistical anomaly detection, and thus, threat patterns are made "more sensitive" when the network activity is abnormal, and "less sensitive" when the activity falls within historical activity norms. The fused threat libraries then search for packet signatures or other threatening activities that are associated with unexplainable high intensity flows or flows that fall outside of historical norms. In one implementation, matching against these threat patterns is completed in the rich framework of Bayesian decision theory. Accordingly, by fusing SNA metric analysis with the other tools described within the enhanced graph matching intrusion detection system (eGMIDS) of the co-pending applications, the eGMIDS is able to identify suspicious insider activity that are currently identified manually.

Additional Approaches and Benefits

The novel combination of SNA metrics and anomaly detection through statistical pattern classification provides great enhancements over existing techniques. For approaches such as anomaly detection, using SNA metric values is a more appropriate choice than other commonly-used feature values because SNA metrics are more descriptive and can define structure, topology, and relationships, rather than simply measuring the volume of data passed between or among individuals, or groups. The use of SNA metrics to convert graph structures into numerical values enables this novel combination of social network analysis and statistical anomaly detection. Without this novel approach, analysts do not have a rigorous way to complete anomaly detection on communication topologies and structures. However, when graphs are distilled into numeric values, an analyst is able to observe data without having any preconceived notion of what is considered normal or abnormal. With this feature-based approach, relationships and anomalies become obvious rather than hidden in a complicated graph structure.

The above described unique and innovative approach to anomaly detection uses dynamic and static Social Network Analysis to classify behaviors as abnormal or normal without the need for labeled training data. The benefit of this approach over other anomaly detection techniques currently being used is the ability to distill complex graph structures into numerical values for subsequent rigorous statistical analysis. The use of SNA metrics to perform anomaly detection makes this approach an improvement over current analysis techniques, as the approach enables more accurate detection and classification.

Practical utilization of SNA_AD methods include but are not limited to the identification of criminal activities, network intrusion detection, identifying "candidates" within a set of individuals for further investigation, identifying trendsetters, finding any activity abnormal or atypical for a particular set of individuals or group, or discovering an activity or event not typical for a single individual given his/her behavior history. In addition, SNA_AD methods are able to detect and mitigate unwanted changes in a collaboration structure imposed by external forces or influence.

While the invention has been particularly shown and described with reference to preferred embodiments, it will be understood by those skilled in the art that various changes in form and detail may be made therein without departing from the spirit and scope of the invention. Any variations, modifications, additions, and improvements to the embodiments described are possible and may fall within the scope of the invention as detailed within the following claims.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

What is claimed is:

1. A computer-implemented method comprising:
  receiving a data set of social network interactions and communications data of multiple participants or actors;
  configuring social network analysis (SNA) metrics and tolerances, wherein the tolerances enable dynamic SNA of what is within a normal range of communication activity/patterns/behavior over a period of time;
  converting the data set to a graphical representation containing a node for each participant among the multiple participants;
  computing SNA metrics values for each node within the graphical representation;
  determining, via use of a plurality of SNA metrics, when the metric value computed for a particular data point within the data set falls outside of a dynamically determined normal range bounded by the tolerances, wherein said determining automatically identifies abnormal events in a provided communication pattern and utilizes unsupervised learning techniques for identification of normal or abnormal behavior, wherein complex aspects of communication patterns identified within the data set are converted into a variety of simple numerical measures and wherein graphical structures are converted into numerical values utilizing SNA metrics; and
  tagging the particular data point whose behavior falls outside the dynamically determined normal range as an anomaly.

2. The method of claim 1, wherein said receiving a dataset comprises:
  receiving a social network graph as a data input, said social network graph being generated utilizing computer based graph representation of communication patterns within a computer network; and
  when the data input is a social network graph, automatically identifying said anomaly as a potential intruder, wherein SNA anomaly identification provides enhanced intrusion detection within an graph-based intrusion detection scheme.

3. The method of claim 1, further comprising:
  accessing a plurality of provided metrics and tolerances to complete the computing of the metric values and the determining step;
  computing a plurality of SNA metrics to be utilized, wherein said SNA metrics are measured on a plurality of people and groups, and wherein individuals and groups whose metrics are atypical in comparison with others are considered anomalous; and
  wherein said determining step comprises completing a statistical pattern classification for detecting abnormal social patterns or events through the use of SNA Metrics.

4. The method of claim 1, further comprising:
  generating model groupings of data points having normal values from the received data set;
  determining whether a threshold baseline for a minimum number of metrics for anomaly evaluation is established;
  when the threshold baseline has not been established, storing the computed metrics;
  determining whether a pre-set minimum number of SNA metrics have been stored to meet the baseline minimum number of metrics for anomaly evaluation; and
  converting a next received data set into a graph when the baseline minimum has not been met.

5. The method of claim 4, further comprising:
when the baseline minimum is established, initiating a comparison to normal function, wherein the values are compared to the normal values;
comparing each data point to said normal values to complete a comparison with a defined normal;
determining if the value is a normal value;
when the value is a normal value, updating a set of normal values to include the present value; and
when the value is not a normal value, flagging the value as an anomaly.

6. The method of claim 1, wherein said determining is completed by executing an SNA_AD utility comprising:
(a) code for determining an anomaly from a given input of social interactions and a set of metrics;
(b) code for generating and displaying an SNA_AD console and enabling user setup, interaction and/or manipulation of processing completed by the determining code; and
(c) code for generating and displaying the output of the anomaly detection processes in user-understandable format;
wherein said code for determining comprises code for differentiating between normal and abnormal activity within the input graph.

7. The method of claim 6, wherein:
the SNA metrics are utilized within said code for determining to complete anomaly detection functions, which functions include analyzing structure, behavior, and communication patterns and isolating indicators of unusual or abnormal activity;
said SNA metrics comprise one or more of: (1) Average cycle length; (2) Average path length; (3) Betweenness centrality; (4) Characteristic path length; (5) Circumference; (5) Cliquishness; (6) Closeness centrality; (7) Closeness centrality (sum of inverse distances); (8) Clustering coefficient; (9) Density; (10) Diameter; (11) External to internal ratio; (12) Girth; (13) Global efficiency; (14) Homogeneity (15) Incoming degree; (16) Local efficiency; (17) Number of nodes; (187) Outgoing degree; (19) Radiality; (20) Radius; and (21) Undirected degree; and
each SNA metric transforms a different aspect of the communication structure into a number, whereby an abstract concept is converted into one or more specific numbers.

8. The method of claim 1, further comprising:
dynamically implementing an unsupervised learning method, wherein observed feature values are referenced against each other rather than against an a priori model of normal, such that each event is classified relative to other unknown events, without any prior classification system, whereby the unsupervised learning method evaluates a large sample of received data and deterministically evaluates which data is normal and which other data is not normal from among all sampled data utilizing SNA metrics and tolerances provided;
wherein further said unsupervised learning is completed based solely on a comparison of at least one of (a) the objects characteristics relative to the characteristics of other data within the groups and (b) the objects observed behavior relative to the object's own past behavior.

9. The method of claim 6, wherein said code for determining comprises code for providing a semi-supervised alerting method, wherein potential detections of anomalies are alerted via the unsupervised anomaly detection algorithms and provided as output to an analyst to selectively determine whether the detection is a true or a false positive.

10. The method of claim 1, wherein said code for determining code comprises:
code for implementing static SNA, wherein said determining code completes a detection of an anomaly via analysis of a single snapshot of activity to determine which participant node is behaving differently than a set of peers; and
code for implementing dynamic SNA, wherein said determining code completes the detection of the anomaly via analysis over a series of snapshots of activity over a time period, such that said analysis compares and models behaviors and behavioral changes over time to approximate a continual time-varying stream of monitored activity, wherein said dynamic SNA enables detection of current anomaly in behavior relative to a prior different behavior previously identified, and wherein each of a sequence of snapshots of the behavior is examined for a change that falls outside of a threshold difference relative to other behavior, relative to a user-defined and dynamically adjusting anomaly threshold range.

11. The method of claim 1, further comprising:
incorporating knowledge about the user or system's overall communication characteristics as values determined via SNA metrics applied to determine threat patterns, utilizing SNA metrics in threat signatures, including, individual, coordinated, insider, and insider-outsider threats; and
analyzing SNA metrics combined with knowledge of a communication's broader context to provide a substantially more powerful result set, wherein said associated context is built from one or more of a social, task, and command and control structures of the participants or actors involved, and from the time history of the SNA metrics for a set period of time.

12. A computer program product comprising:
a computer readable medium; and
program code on the computer readable medium that when executed by a processor provides the functions of:
receiving a data set of social network interactions and communications data of multiple participants or actors;
configuring social network analysis (SNA) metrics and tolerances, wherein the tolerances enable dynamic SNA of what is within a normal range of communication activity/patterns/behavior over a period of time;
converting the data set to a graphical representation containing a node for each participant or actor among the multiple participants or actors;
computing SNA metrics values for each node within the graphical representation;
determining, via use of a plurality of SNA metrics, when the metric value computed for a particular data point within the data set falls outside of a dynamically determined normal range bounded by the tolerances, wherein said determining automatically identifies abnormal events in a provided communication pattern and utilizes unsupervised learning techniques for identification of normal or abnormal behavior, wherein complex aspects of communication patterns identified within the data set are converted into a variety of simple numerical measures and wherein graphical structures are converted into numerical values utilizing SNA metrics; and
tagging the particular data point whose behavior falls outside the dynamically determined normal range as an anomaly.

13. The computer program product of claim 12, wherein said program code for receiving a dataset comprises code for:
  receiving a social network graph as a data input, said social network graph being generated utilizing computer based graph representation of communication patterns within a computer network; and
  when the data input is a social network graph, automatically identifying said anomaly as a potential intruder, wherein SNA anomaly identification provides enhanced intrusion detection within an graph-based intrusion detection scheme.

14. The computer program product of claim 12, further comprising program code for:
  accessing a plurality of provided metrics and tolerances to complete the computing of the metric values and the determining step;
  computing a plurality of SNA metrics to be utilized, wherein said SNA metrics are measured on a plurality of people and groups, and wherein individuals and groups whose metrics are atypical in comparison with others are considered anomalous; and
  completing a statistical pattern classification for detecting abnormal social patterns or events through the use of SNA Metrics.

15. The computer program product of claim 12, further comprising program code for:
  generating model groupings of data points having normal values from the received data set;
  determining whether a threshold baseline for a minimum number of metrics for anomaly evaluation is established;
  when the threshold baseline has not been established, storing the computed metrics;
  determining whether a pre-set minimum number of SNA metrics have been stored to meet the baseline minimum number of metrics for anomaly evaluation; and
  converting a next received data set into a graph when the baseline minimum has not been met.

16. The computer program product of claim 15, further comprising program code for:
  when the baseline minimum is established, initiating a comparison to normal function, wherein the values are compared to the normal values;
  comparing each data point to said normal values to complete a comparison with a defined normal;
  determining if the value is a normal value;
  when the value is a normal value, updating a set of normal values to include the present value; and
  when the value is not a normal value, flagging the value as an anomaly.

17. The computer program product of claim 12, wherein said program code for said determining comprises program code for implementing an SNA_AD utility comprising:
  (a) code for determining an anomaly from a given input of social interactions and a set of metrics; (b) code for generating and displaying an SNA_AD console and enabling user setup, interaction and/or manipulation of processing completed by the determining code; and (c) code for generating and displaying the output of the anomaly detection processes in user-understandable format; wherein said SNA-AD utility comprises a plurality of coded functions, including: a configure function, a process input function, an establish normal function, a detect anomalies function, and an analyze anomaly function;
  wherein said code for enabling said detect anomalies function further comprises code for enabling a compute metrics function and a compare to normal values function, wherein compute metrics function generates new metric values, which are inputted to compare to clusters function; and
  wherein said code for said compare to normal values function compares the new metric values to established normal values and determines how far away from normal each new metric value is, wherein further, when a point in the input is outside of the established anomaly tolerances when compared to the normal clusters, the compare to normal values function issues an output of detected anomaly and the particular point is flagged as an anomaly;
  wherein said code for determining comprises code for differentiating between normal and abnormal activity within the input graph, said code including code for:
    computing a betweenness centrality of a specific node in a sociogram to generate a value that measures how often communications in the organization flows through a given person; and
    computing density and global efficiency metrics to measure how much redundancy exists in a communication structure;
  wherein the SNA metrics are utilized within said determining code to complete anomaly detection functions, which functions include analyzing structure, behavior, and communication patterns and isolating indicators of unusual or abnormal activity;
  wherein said SNA metrics comprise one or more of: (1) Average cycle length; (2) Average path length; (3) Betweenness centrality; (4) Characteristic path length; (5) Circumference; (5) Cliquishness; (6) Closeness centrality; (7) Closeness centrality (sum of inverse distances); (8) Clustering coefficient; (9) Density; (10) Diameter; (11) External to internal ratio; (12) Girth; (13) Global efficiency; (14) Homogeneity (15) Incoming degree; (16) Local efficiency; (17) Number of nodes; (187) Outgoing degree; (19) Radiality; (20) Radius; and (21) Undirected degree; and
  each SNA metric transforms a different aspect of the communication structure into a number, whereby an abstract concept is converted into one or more specific numbers.

18. The computer program product of claim 12, wherein said program code further comprises code for:
  dynamically implementing an unsupervised learning method, wherein observed feature values are referenced against each other rather than against an a priori model of normal, such that each event is classified relative to other unknown events, without any prior classification system, whereby the unsupervised learning method evaluates a large sample of received data and deterministically evaluates which data is normal and which other data is not normal from among all sampled data utilizing SNA metrics and tolerances provided;
  wherein further said unsupervised learning is completed based solely on a comparison of at least one of (a) the objects characteristics relative to the characteristics of other data within the groups and (b) the objects observed behavior relative to the object's own past behavior.

19. The computer program product of claim 17, wherein said code for determining comprises code for providing a semi-supervised alerting method, wherein potential detections of anomalies are alerted via the unsupervised anomaly detection algorithms and provided as output to an analyst to selectively determine whether the detection is a true or a false positive.

20. The computer program product of claim 12, wherein said determining code comprises code for:

code for implementing static SNA wherein said determining code completes a detection of an anomaly via analysis of a single snapshot of activity to determine which participant node is behaving differently than a set of peers; and code for implementing dynamic SNA, wherein said determining code completes the detection of the anomaly via analysis over a series of snapshots of activity over a time period, such that said analysis compares and models behaviors and behavioral changes over time to approximate a continual time-varying stream of monitored activity, wherein said dynamic SNA enables detection of current anomaly in behavior relative to a prior different behavior previously identified, and wherein each of a sequence of snapshots of the behavior is examined for a change that falls outside of a threshold difference relative to other behavior, relative to a user-defined and dynamically adjusting anomaly threshold range.

21. The computer program product of claim 12, further comprising program code for:

incorporating knowledge about the user or system's overall communication characteristics as values determined via SNA metrics applied to determine threat patterns, utilizing SNA metrics in threat signatures, including, individual, coordinated, insider, and insider-outsider threats; and analyzing SNA metrics combined with knowledge of a communication broader context to provide a substantially more powerful result set, wherein said associated context is built from one or more of a social, task, and command and control structures of the participants or actors involved, and from the time history of the SNA metrics for a set period of time.

22. The computer program product of claim 12, further comprising program code for:

performing communication pattern analysis utilizing the SNA metrics, wherein the determining code measures an amount of information flowing between participants or actors in counts of communications, emails, or network packets;

wherein communications patterns are analyzed with respect to related network structures to identify flows that are not well explained by the related networks, and wherein time histories of flows are utilized to build statistical representations of historical normal communications patterns, which are then utilized to identify communications flows that signify a change from the historical normal communications patterns; and completing the anomaly detection with analyst inputs to enable a determination of whether deviations from historical normal communication patterns have an acceptable explanation or whether the deviations are the result of an infected or compromised machine or a malicious insider activity.

23. A computing device comprising:
a processor;
a memory coupled to the processor;
at least one input/output (I/O) component for receiving social network data and user inputs; and
an SNA_AD (social network analysis anomaly detection) utility comprising program code executing on the processor that performs the functions of:

receiving a data set of social network interactions and communications data of multiple participants or actors;

configuring SNA metrics and tolerances, wherein the tolerances enable dynamic SNA of what is within a normal range of communication activity/patterns/behavior over a period of time;

converting the data set to a graphical representation containing a node for each participant or actor among the multiple participants or actors;

computing metrics values for each node within the graphical representation;

determining, via use of a plurality of SNA metrics, when the metric value computed for a particular data point within the data set falls outside of a dynamically determined normal range bounded by the tolerances, wherein said determining automatically identifies abnormal events in a provided communication pattern and utilizes unsupervised learning techniques for identification of normal or abnormal behavior, wherein complex aspects of communication patterns identified within the data set are converted into a variety of simple numerical measures and wherein graphical structures are converted into numerical values utilizing SNA metrics; and tagging the particular data whose behavior falls outside the normal range as an anomaly.

24. The computing device of claim 23, wherein said program code for receiving a dataset comprises code for:

receiving a social network graph as a data input, said social network graph being generated utilizing computer based graph representation of communication patterns within a computer network; and when the data input is a social network graph, automatically identifying said anomaly as a potential intruder, wherein SNA anomaly identification provides enhanced intrusion detection within an graph-based intrusion detection scheme.

25. The computing device of claim 23, said SNA_AD utility further comprising program code for:

accessing a plurality of provided metrics and tolerances to complete the computing of the metric values and the determining step;

computing a plurality of SNA metrics to be utilized, wherein said SNA metrics are measured on a plurality of people and groups, and wherein individuals and groups whose metrics are atypical in comparison with others are considered anomalous; and completing a statistical pattern classification for detecting abnormal social patterns or events through the use of SNA Metrics.

26. The computing device of claim 23, said SNA_AD utility further comprising program code for:

grouping data points from the received data set to generate model groupings having normal values;

determining whether a threshold baseline for a minimum number of metrics for anomaly evaluation is established;

when the threshold baseline has not been established, storing the computed metrics;

determining whether a pre-set minimum number of SNA metrics have been stored to meet the baseline minimum number of metrics for anomaly evaluation; and converting a next received data set into a graph when the baseline minimum has not been met.

27. The computing device of claim 26, said SNA_AD utility further comprising program code for:

when the baseline minimum is established, initiating a comparison to normal function, wherein the values are compared to the normal values;

comparing each data point to said normal values to complete a comparison with a defined normal;
determining if the value is a normal value;
when the value is a normal value, updating a set of normal values to include the present value; and
when the value is not a normal value, flagging the value as an anomaly.

28. The computing device of claim 23, wherein said program code for said SNA_AD utility further comprises:
(a) code for determining an anomaly from a given input of social interactions and a set of metrics; (b) code for generating and displaying an SNA_AD console and enabling user setup, interaction and/or manipulation of processing completed by the determining code; and (c) code for generating and displaying the output of the anomaly detection processes in user-understandable format; wherein said SNA-AD utility comprises a plurality of coded functions, including: a configure function, a process input function, an establish normal function, a detect anomalies function, and an analyze anomaly function;
wherein said code for enabling said detect anomalies function further comprises code for enabling a compute metrics function and a compare to groupings function, wherein compute metrics function generates new metric values, which are inputted to compare to clusters function; and
wherein said code for said compare to groupings function compares the new metric values to established normal groupings and determines how far away from normal each new metric value is, wherein further, when a point in the input is outside of the established anomaly tolerances when compared to the normal values, the compare to groupings function issues an output of detected anomaly and the particular point is flagged as an anomaly;
wherein said code for determining comprises code for differentiating between normal and abnormal activity within the input graph, said code for differentiating including code for:
computing a betweenness centrality of a specific node in a sociogram to generate a value that measures how often communications in the organization flows through a given person; and
computing a density and global efficiency metrics to measure how much redundancy exists in a communication structure;
wherein the SNA metrics are utilized within said determining code to complete anomaly detection functions, which functions include analyzing structure, behavior, and communication patterns and isolating indicators of unusual or abnormal activity;
wherein said SNA metrics comprise one or more of: (1) Average cycle length; (2) Average path length; (3) Betweenness centrality; (4) Characteristic path length; (5) Circumference; (5) Cliquishness; (6) Closeness centrality; (7) Closeness centrality (sum of inverse distances); (8) Clustering coefficient; (9) Density; (10) Diameter; (11) External to internal ratio; (12) Girth; (13) Global efficiency; (14) Homogeneity (15) Incoming degree; (16) Local efficiency; (17) Number of nodes; (187) Outgoing degree; (19) Radiality; (20) Radius; and (21) Undirected degree; and
each SNA metric transforms a different aspect of the communication structure into a number, whereby an abstract concept is converted into one or more specific numbers.

29. The computing device of claim 23, wherein said SNA_AD utility further comprises code for:
dynamically implementing an unsupervised learning method, wherein observed feature values are referenced against each other rather than against an a priori model of normal, such that each event is classified relative to other unknown events, without any prior classification system, whereby the unsupervised learning method evaluates a large sample of received data and deterministically evaluates which data is normal and which other data is not normal from among all sampled data utilizing SNA metrics and tolerances provided;
wherein further said unsupervised learning is completed based solely on a comparison of at least one of (a) the objects characteristics relative to the characteristics of other data within the groups and (b) the objects observed behavior relative to the object's own past behavior.

30. The computing device of claim 29, wherein said determining code comprises code for:
providing a semi-supervised alerting method, wherein potential detections of anomalies are alerted via the unsupervised anomaly detection algorithms and provided as output to an analyst to selectively determine whether the detection is a true or a false positive;
implementing static SNA wherein said determining code completes a detection of an anomaly via analysis of a single snapshot of activity to determine which participant node is behaving differently than a set of peers; and
implementing dynamic SNA, wherein said determining code completes the detection of the anomaly via analysis over a series of snapshots of activity over a time period, such that said analysis compares and models behaviors and behavioral changes over time to approximate a continual time-varying stream of monitored activity, wherein said dynamic SNA enables detection of current anomaly in behavior relative to a prior different behavior previously identified, and wherein each of a sequence of snapshots of the behavior is examined for a change that falls outside of a threshold difference relative to other behavior, relative to a user-defined and dynamically adjusting anomaly threshold range.

31. The computing device of claim 23, said SNA_AD utility further comprising program code for:
incorporating knowledge about the user or system's overall communication characteristics as values determined via SNA metrics applied to determine threat patterns, utilizing SNA metrics in threat signatures, including, individual, coordinated, insider, and insider-outsider threats; and
analyzing SNA metrics combined with knowledge of a communication broader context to provide a substantially more powerful result set, wherein said associated context is built from one or more of a social, task, and command and control structures of the participants or actors involved, and from the time history of the SNA metrics for a set period of time.

32. The computing device of claim 23, said SNA_AD utility further comprising program code for:
performing communication pattern analysis utilizing the SNA metrics, wherein the determining code measures an amount of information flowing between participants or actors in counts of communications, emails, or network packets;
wherein communications patterns are analyzed with respect to related network structures to identify patterns that are not well explained by the related networks, and wherein time histories of flows are utilized to build statistical representations of historical normal communications patterns, which are then utilized to identify communications flows that signify a change from the historical normal communications patterns; and completing the anomaly detection with analyst inputs to enable a determination of whether deviations from historical normal communication patterns have an acceptable explanation or whether the deviations are the result of an infected or compromised machine or a malicious insider activity.

* * * * *